US012623896B2

(12) United States Patent
Wei et al.

(10) Patent No.: US 12,623,896 B2
(45) Date of Patent: May 12, 2026

(54) ELECTRIC JAR OPENER

(71) Applicant: Ningbo Lobone Household Items Co., Ltd., Ningbo (CN)

(72) Inventors: Renjian Wei, Ningbo (CN); Lihua Zhou, Ningbo (CN)

(73) Assignee: Ningbo Lobone Household Items Co., Ltd., Ninghai County (CN)

( * ) Notice: Subject to any disclaimer, the term of this patent is extended or adjusted under 35 U.S.C. 154(b) by 302 days.

(21) Appl. No.: 18/601,231

(22) Filed: Mar. 11, 2024

(65) Prior Publication Data

US 2025/0223148 A1 Jul. 10, 2025

(30) Foreign Application Priority Data

Jan. 9, 2024 (CN) ........................ 202410032801.X

(51) Int. Cl.
*B67B 7/18* (2006.01)

(52) U.S. Cl.
CPC .................................... *B67B 7/182* (2013.01)

(58) Field of Classification Search
CPC .... B67B 7/12; B67B 7/14; B67B 7/16; B67B 7/164; B67B 7/18; B67B 7/182; B67B 7/38; F16B 2/12
See application file for complete search history.

(56) References Cited

U.S. PATENT DOCUMENTS 7,398,714 B1 * 7/2008 Mah ........................ B67B 7/182 81/3.2
2009/0229418 A1 * 9/2009 Garman .................. B67B 7/182 81/3.4

* cited by examiner

*Primary Examiner* — Robert J Scruggs
(74) *Attorney, Agent, or Firm* — Wang Law Firm, Inc.

(57) ABSTRACT

The present invention discloses an electric jar opener comprising a housing; a first clamping jaw group; a second clamping jaw group; a movement mechanism. The first clamping jaw group comprises two oppositely-disposed mutually facing first clamping jaws for clamping a can body, the second clamping jaw group comprises two oppositely-disposed mutually facing second clamping jaws for clamping and screwing a lid; the movement mechanism comprises a motor and a differential with two outputs; a first output of the differential is in transmission connection to the first clamping jaws and a second output thereof is in transmission connection to the second clamping jaws. By use of the differential, the first output of the differential is in transmission connection to the first clamping jaws and the second output thereof is in transmission connection to the second clamping jaws, so that the whole machine operates in a balanced and stable manner.

10 Claims, 17 Drawing Sheets

ELECTRIC JAR OPENER

TECHNICAL FIELD OF THE INVENTION

The present invention relates to a field of small household tools, and in particular to an electric jar opener.

BACKGROUND OF THE INVENTION

In recent years, for the convenience of life, some cooked products are packaged in jar bodies after processing in many countries and areas, and lids are then screwed on the jar bodies through threads. Such canned products are convenient to carry and quick to eat on a trip. However, for food packaging, the food in the jar body is usually sealed by vacuum. When it is necessary to open the jar body, in order to overcome a friction and vacuum pressure between the lid and the jar body, it is often impossible to directly unscrew the lid by a hand, and additional tools are needed to destroy the vacuum inside the jar body before opening, so that it is difficult to open the jar body.

For this purpose, jar openers, as a kind of household tools for opening jars, have been invented. Jar openers are generally classified into hand-operated jar openers and electric jar openers, wherein the electric jar openers are easy to operate and can automatically open jars by pressing the START button manually. The existing electric jar opener, as disclosed in a Chinese Patent CN201343432Y (patent No.: 200820003894.X), comprises: a housing; two oppositely-disposed mutually facing jar engaging and clamping elements extending downward from the housing; two oppositely-disposed mutually facing lid engaging and clamping elements extending downward from the housing to be adjacent to the jar engaging and clamping elements; and, a motor which is arranged in the housing and connected to the jar engaging and clamping elements and the lid engaging and clamping elements in a gear transmission manner so that the lid engaging and clamping elements move relative to the jar engaging and clamping elements.

While in the above structure, the transmission among the motor, the main clamping jaw and the lid clamping jaw is realized by a series of gears. When a resistance of the main clamping jaw and the resistance of the lid clamping jaw are different, the driving forces of the respective driving gears are correlated. Thus, interference and slippage may occur between the gears, thereby easily damaging the gears and affecting the normal operation.

SUMMARY OF THE INVENTION

It is an object of the present invention to provide an electric jar opener which can operate in a balanced and stable manner.

For achieving the above object, the electric jar opener comprises a housing; a first clamping jaw group extending from the housing; a second clamping jaw group extending from the housing; a movement mechanism disposed inside the housing; wherein, the first clamping jaw group comprises two oppositely-disposed mutually facing first clamping jaws for clamping a jar body, and the second clamping jaw group comprises two oppositely-disposed mutually facing second clamping jaws for clamping and screwing a lid;

the movement mechanism comprises a motor and a differential with two outputs driven by the motor, the movement mechanism is capable of driving the first clamping jaws and the second clamping jaws to move; a first output of the differential is in transmission connection to the first clamping jaws and a second output thereof is in transmission connection to the second clamping jaws.

Specifically, the differential has the following structure: the differential comprises one or more planetary gears, a transmission shaft, a rotatable shell which is driven by the motor to rotate about an axis of the transmission shaft, an intermediate gear, a first driven gear and a second driven gear; each planetary gear is disposed inside the shell, when driven by the shell each planetary gear is capable of rotating about the axis of the transmission shaft and is also capable of rotating relative to the shell, the transmission shaft rotates together with the shell;

each planetary gear engages with the intermediate gear, the first driven gear rotates together with the intermediate gear, the second driven gear rotates together with the transmission shaft; the first driven gear defined as the first output end of the differential is in transmission connection to the first clamping jaws, and the second driven gear defined as the second output of the differential is in transmission connection to the second clamping jaws.

The first output of the differential is in transmission connection to the first clamping jaws and the second output thereof is in transmission connection to the second clamping jaws by use of the differential. Even if the resistance suffered by the first clamping jaws and the resistance suffered by the second clamping jaws are different, different output rotation speeds can be adjusted by the differential, so that the whole machine operates in a balanced and stable manner.

To realize the movement of the planetary gears, according to one aspect of the present invention, the differential further comprises a support frame disposed inside the shell, the support frame comprises a main rod and one or more branch rods connecting to the main rod; the transmission shaft passes through the main rod and rotates together with the main rod, each branch rod extends and inclines upward from a periphery of the main rod away from the main rod, each planetary gear is rotatably arranged on one branch rod;

a first transmission gear formed at an inner surface of the shell engages with the planetary gear;

the differential further comprises a second transmission gear defined as the intermediate gear and is integrally connected to the first driven gear. This solution can improve the convenience of mounting and realize large-torque output.

To realize the movement of the planetary gears, according to another aspect of the present invention, the differential further comprises two side gears which are arranged around the axis of the transmission shaft, the planetary gear is rotatably supported inside the shell, and the planetary gear engages with the two side gears;

one of the two side gears rotates together with the transmission shaft, while the other of the two side gears is defined as the intermediate gear.

To facilitate the differential to drive two clamping jaws to move, each first clamping jaw comprises a first rack portion engaging with the first driven gear, each second clamping jaw comprises a second rack portion engaging with the second driven gear.

To facilitate the first clamping jaws to clamp the jar body and the second clamping jaws to clamp the lid, each first clamping jaw further comprises bent portions arranged at ends of the first rack portions away from the first driven gear and first clamping portions arranged at ends of the corresponding bent portion away from the corresponding first rack portion;

each second clamping jaw is arranged below each first rack portion and located between the bent portions, each second clamping jaw further comprises a second clamping portion arranged at an end of the corresponding second rack portion, and each first clamping portion is located below each second clamping portion.

To further clamp the lid when screwing the lid, the housing comprises an upper housing, a lower housing and a rotating housing arranged below the lower housing and used for clamping the lid, the second clamping jaws protrude from a bottom of the rotating housing, and the movement mechanism can drive the rotating housing to rotate relative to the lower housing.

Preferably, to facilitate the cooperation of the movement mechanism and the rotating housing, the rotating housing comprises a bottom plate and a rotating device arranged on an upper surface of the bottom plate, the second clamping jaws protrude from a bottom of the bottom plate, and the bottom plate has a partial bottom surface protruded upward for receiving the second driven gear.

To facilitate resetting after screwing the lid, the rotating device comprises a first circular ring, the first circular ring comprises a first semicircle and a second semicircle which are combined to form the whole first circular ring, and a diameter of the first semicircle is smaller than that of the second semicircle;

the housing further comprises a base arranged between the lower housing and the rotating housing, and the base is firmly connected to the lower housing and rotatably connected to the rotating housing;

a driven cam resisted against a circumferential wall of the first circular ring and a steering switch for controlling the forward or backward rotation of the motor are also arranged on the base, the driven cam is disengaged from the steering switch when the driven cam engages with the first semicircle, and the driven cam resists against the steering switch when the driven cam engages with the second semicircle.

To prevent the rotating housing from rotation during the translation process of the clamping jaws, the rotating device further comprises a second circular ring, two cam grooves recessed radially inward on a circumferential wall of the second circular ring, and the two cam grooves are circumferentially symmetrical;

the housing further comprises a base arranged between the lower housing and the rotating housing, and the base is firmly connected to the lower housing and rotatably connected to the rotating housing;

a cam extension portion is also arranged on the base, and the cam extension portion is urged into one of the cam grooves by a corresponding elastic element.

Compared with the prior art, the present invention has the following advantages. By use of the differential, the first output of the differential is in transmission connection to the first clamping jaws and the second output thereof is in transmission connection to the second clamping jaws. Even if the resistance suffered by the first clamping jaws and the resistance suffered by the second clamping jaws are different, different output rotation speeds jar be adjusted by the differential, so that the whole machine operates in a balanced and stable manner.

DETAILED DESCRIPTION OF THE INVENTION

Figure 1:
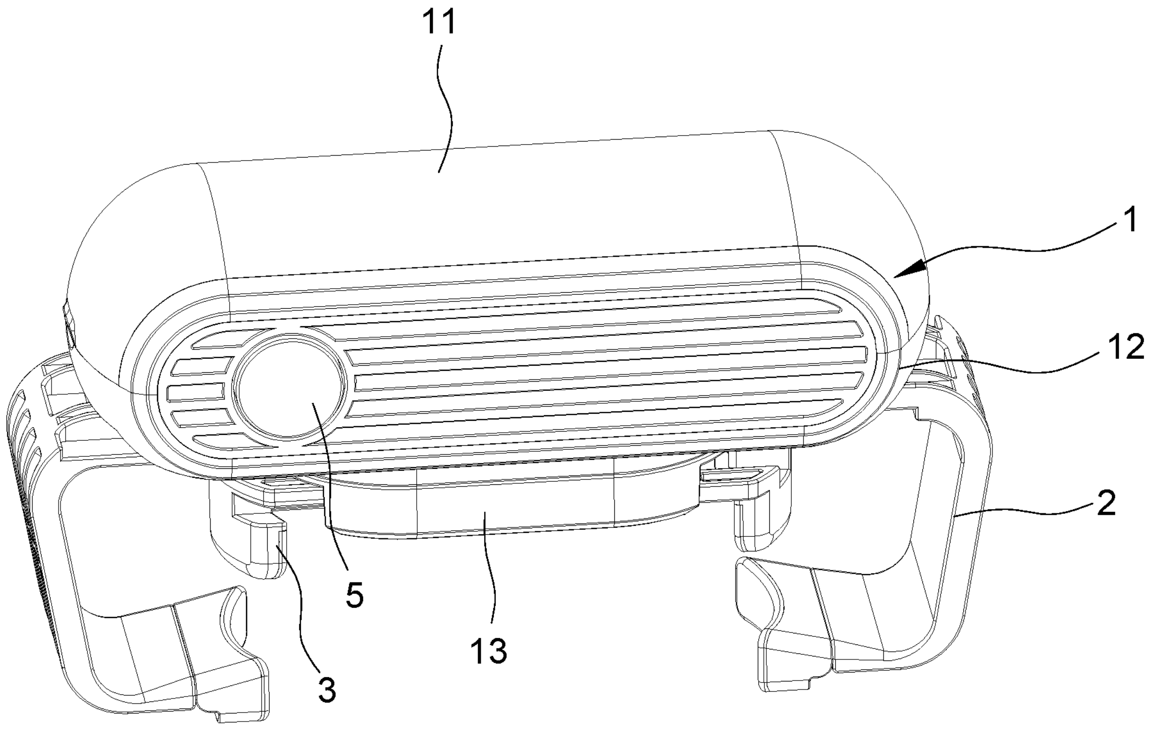
FIG. 1 is a perspective view of an electric jar opener according to Embodiment 1 of the present invention.
Figure 2:
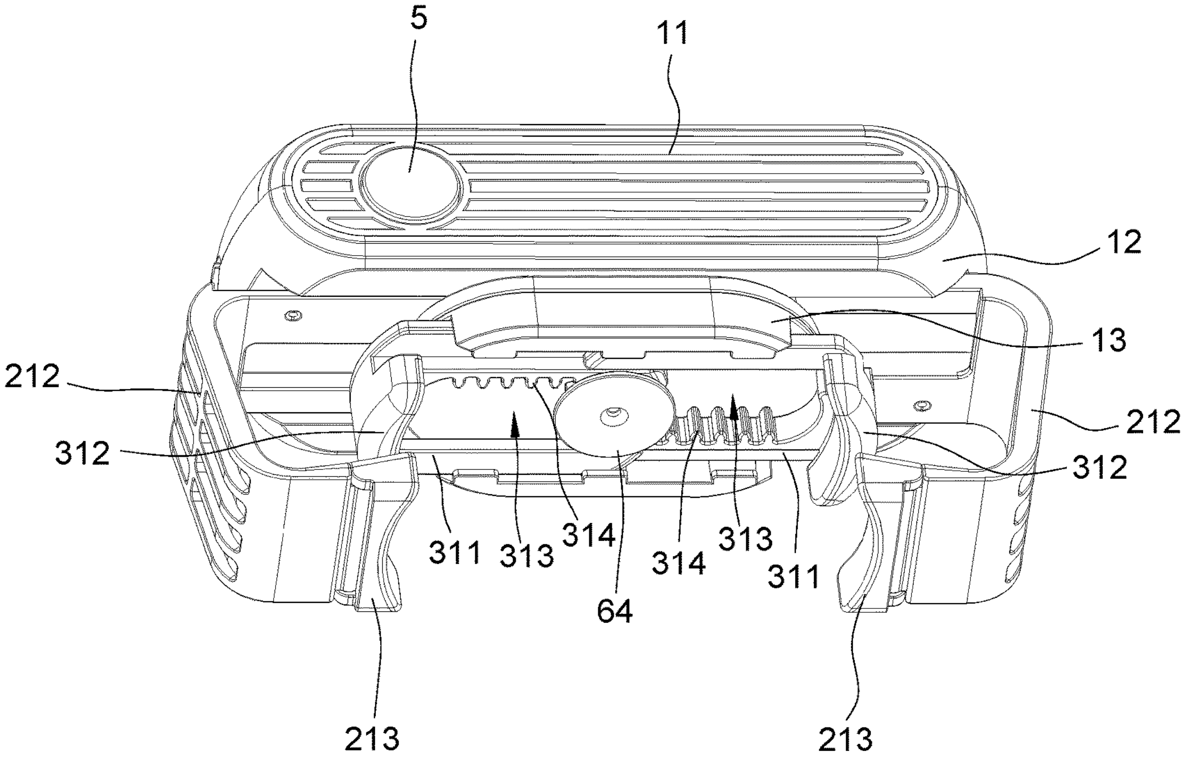
FIG. 2 is a perspective view of the electric jar opener according to Embodiment 1 of the present invention (viewed from bottom to top)
Figure 3:
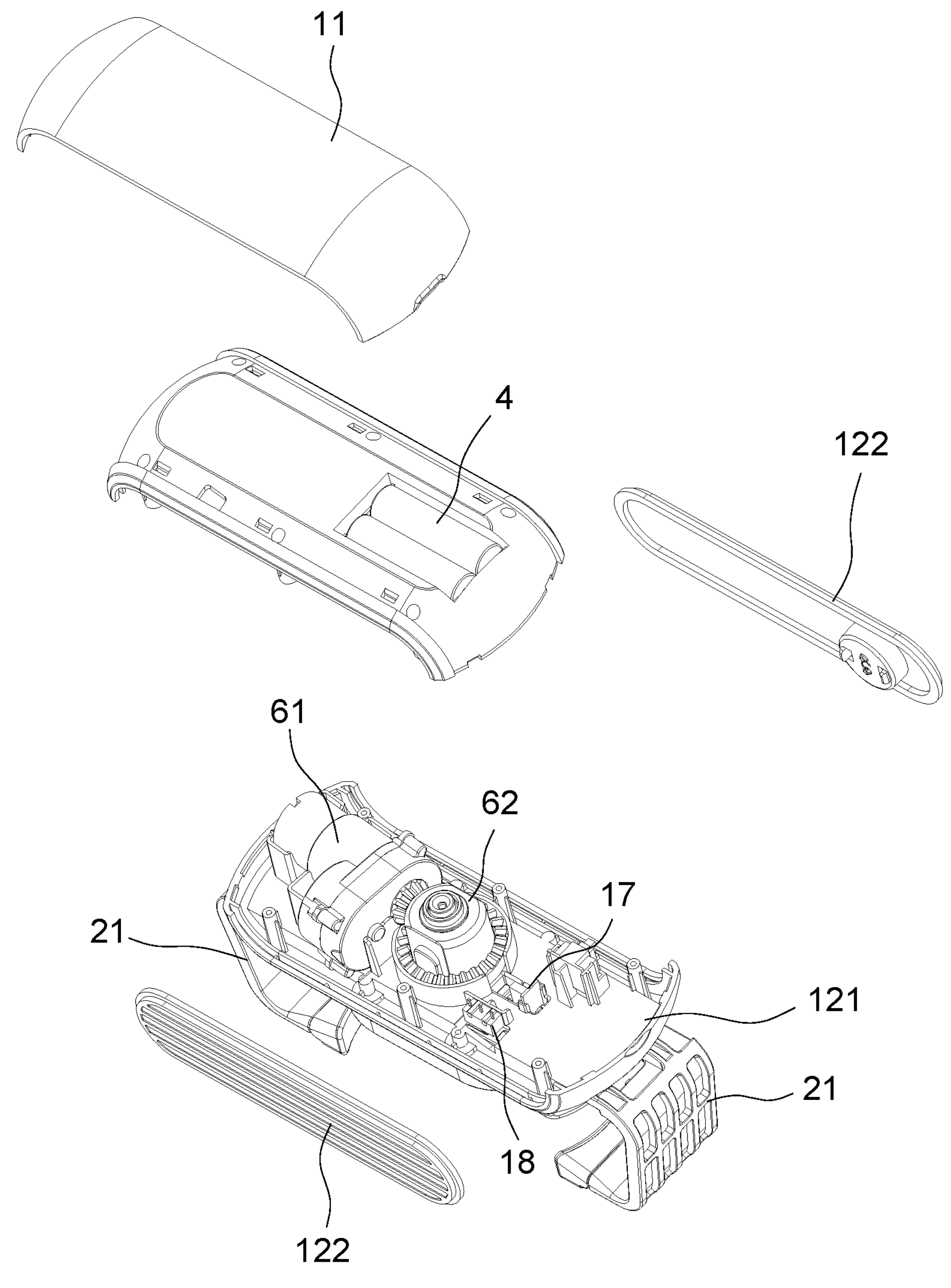
FIG. 3 is an exploded view of the electric jar opener according to Embodiment 1 of the present invention.
Figure 4:
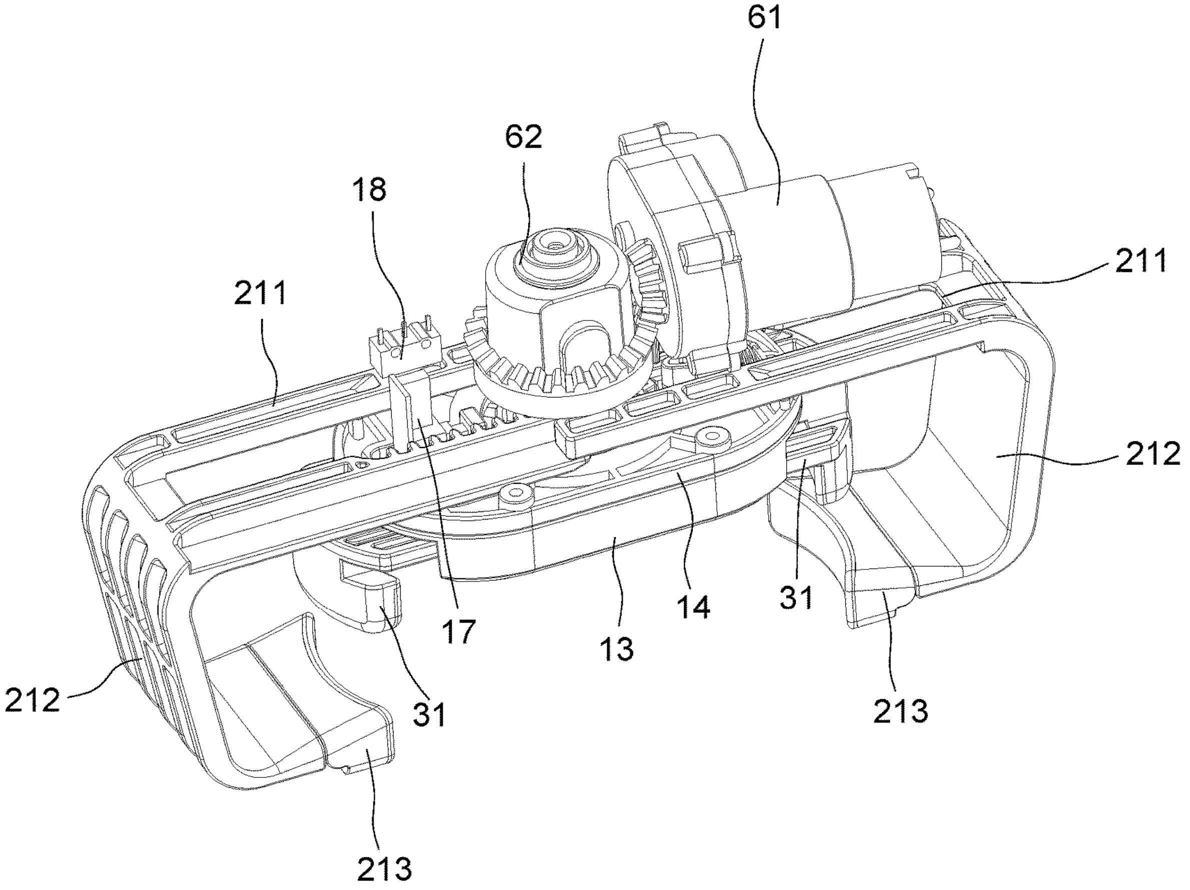
FIG. 4 is a perspective view of the electric jar opener according to Embodiment 1 of the present invention when a housing is omitted.
Figure 5:
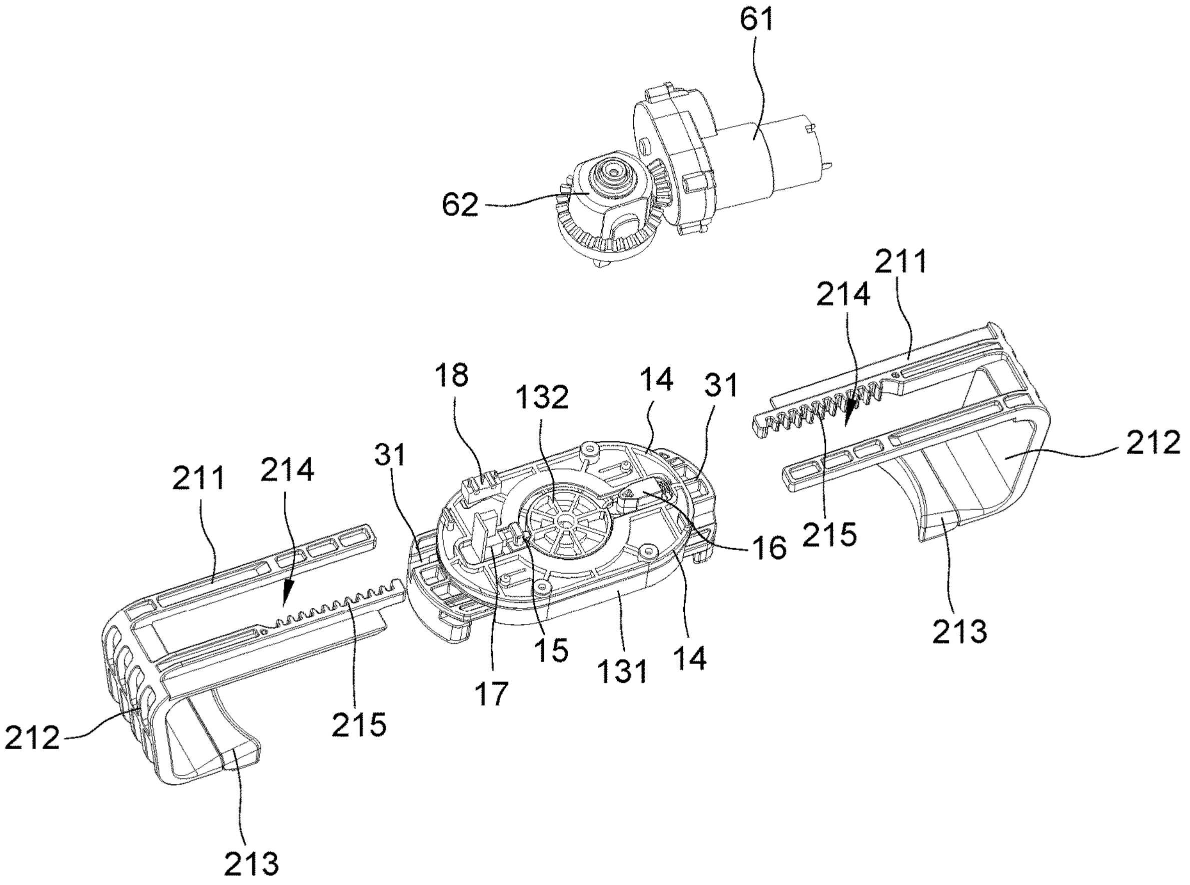
FIG. 5 is an exploded view of the FIG. 4.
Figure 6:
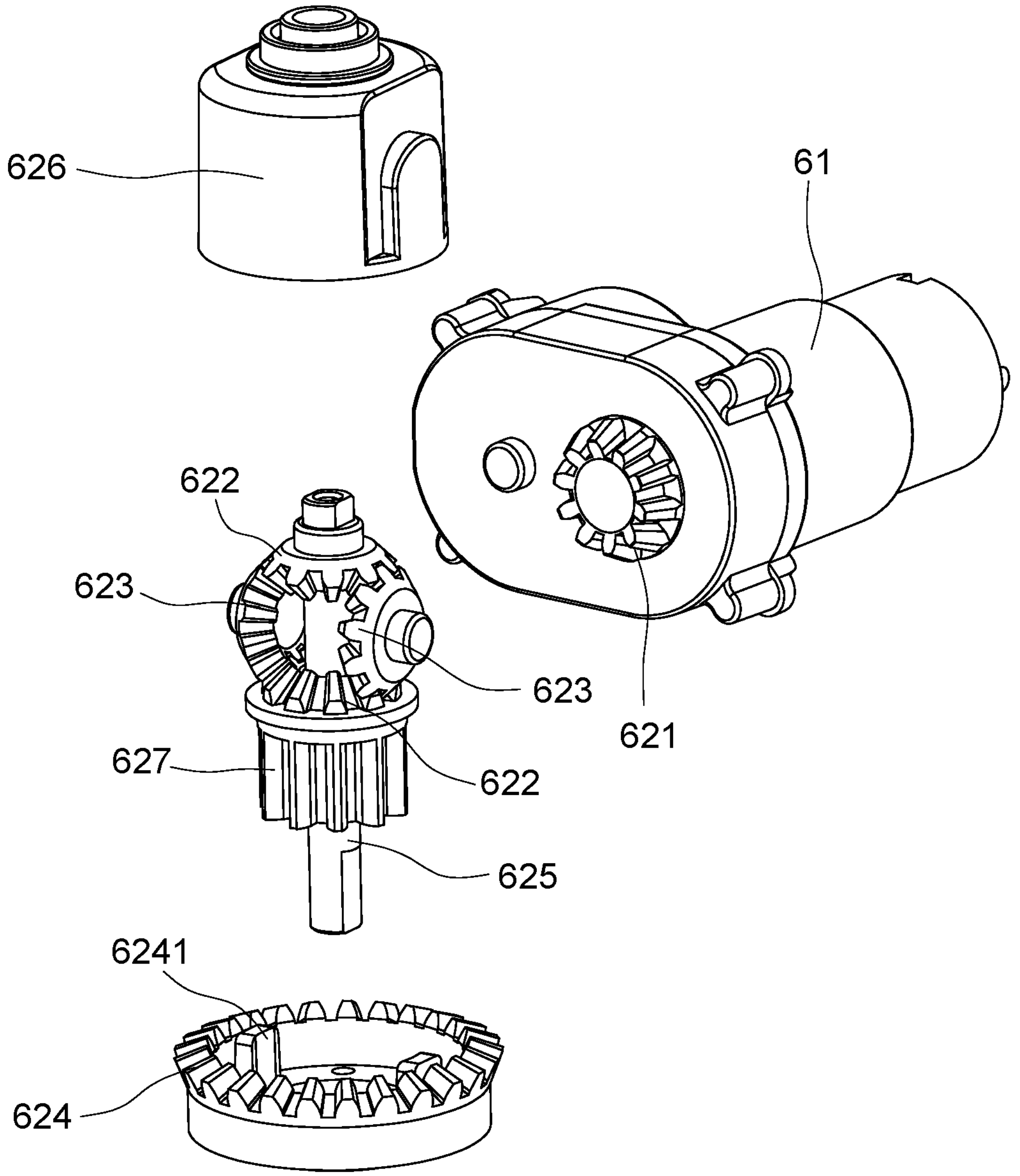
FIG. 6 is a perspective view of a motor and a movement mechanism of the electric jar opener according to Embodiment 1 of the present invention.
Figure 7:
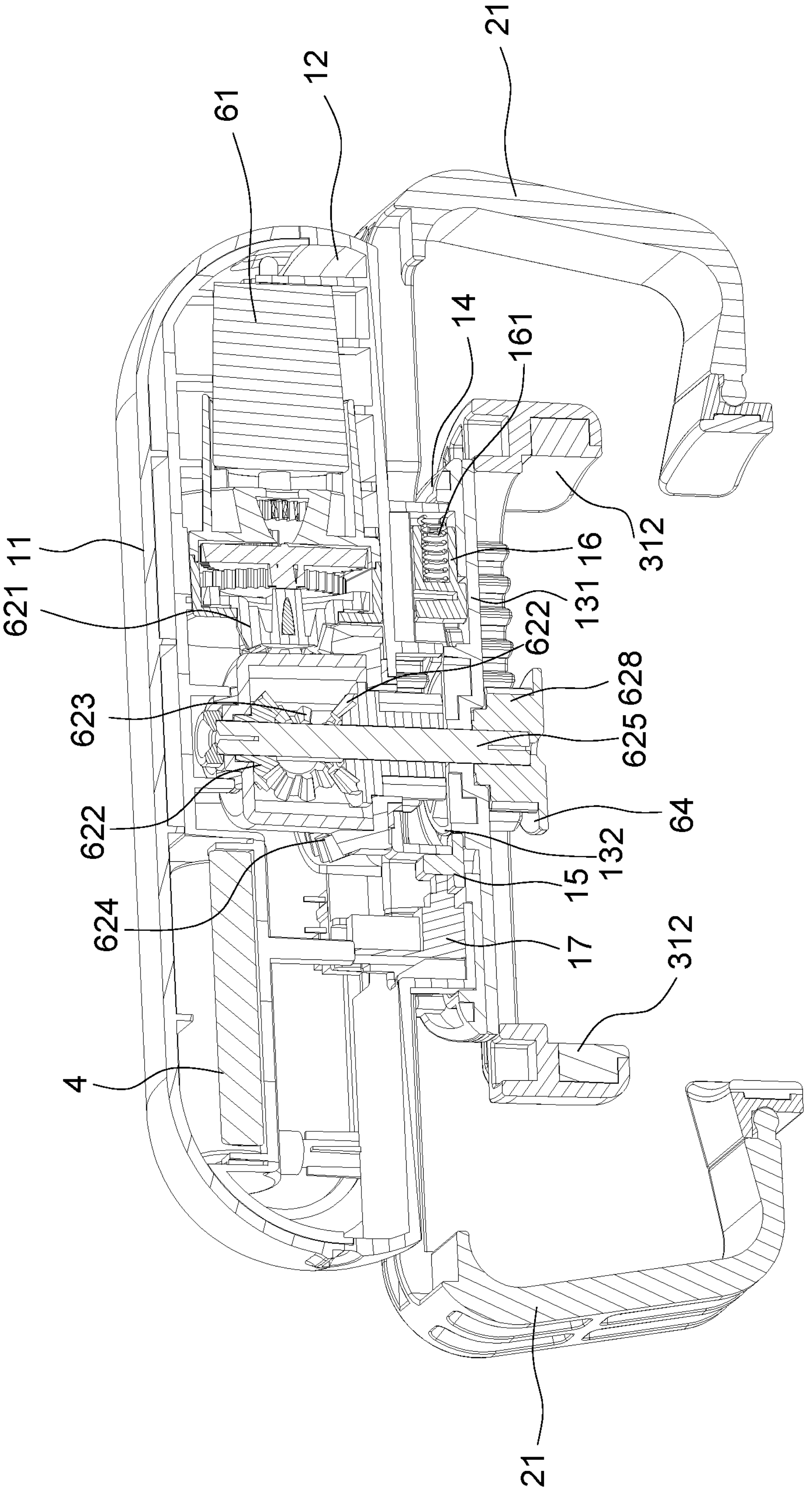
FIG. 7 is a sectional view (longitudinal section) of the electric jar opener according to Embodiment 1 of the present invention.

The present invention will be further described in detail with reference to the accompanying drawings by embodiments, throughout which the same or similar reference numerals indicate the same or similar elements or elements having the same or similar functions.

It should be noted that in the description of the present invention, the terms “center”, “longitudinally”, “horizontally”, “length”, “width”, “thickness”, “up, down”, “front, back”, “left, right”, “vertical”, “parallel”, “top, bottom”, “inside, outside”, “clockwise”, “counterclockwise”, “axial direction”, “radial direction”, “circumferential direction”, etc. to describe a direction or position based on the accompanying drawings are only used for describe the present invention and simplify the description, instead of indicating that devices or elements must have particular orientation or must be constructed and operated in a particular orientation. Since the embodiments disclosed by the present invention jar be set in different directions, these terms indicating directions are only used as explanations and should not be used as restrictions. For example, the verbs “up”, “down” should not be limited to the direction opposite or consistent with the gravity. In addition, a feature defined as "first" or "second" may explicitly or implicitly comprises one or more such features.

Embodiment 1

As shown in FIGS. 1-5, an electric jar opener comprises a housing 1, a first clamping jaw group 2 and a second clamping jaw group 3, wherein the housing 1 comprises an upper housing 11 and a lower housing 12 which can be snap-fitted with each other, and both the upper housing 11 and the lower housing 12 are arc-shaped for the convenience of holding. A battery 4 is arranged in the upper housing 11 to supply power to a motor 61 (as will be described below), and the upper housing 11 may be two separate housings which are detachably connected, so that it is convenient to assemble or disassemble the battery 4. The lower housing 12 comprises a bottom housing 121 and two oppositely-disposed mutually facing side plates 122 arranged on the bottom housing 121, a button 5 is arranged on one of the side plates 122, and a switch member 51 is arranged in the lower housing 12. By use of the button 5 and the switch member 51, it is convenient to control the on or off of the circuit between the battery 4 and the motor 61, so as to turn on or off the jar opener.

Figure 8:
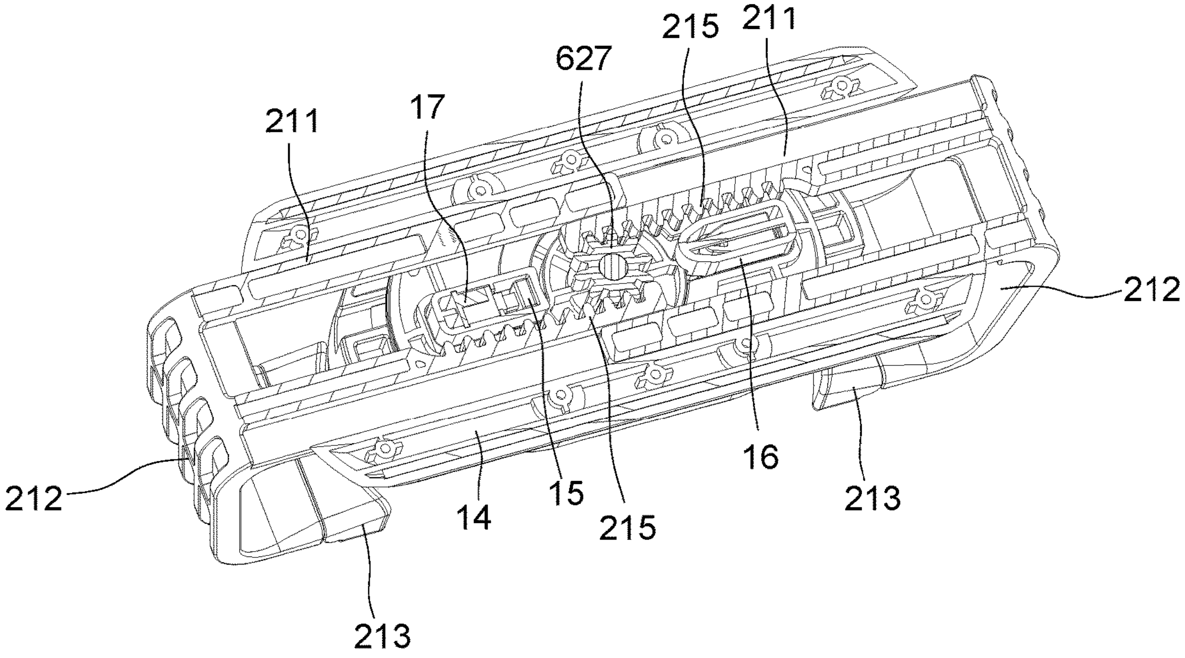
FIG. 8 is a sectional view (transverse section) of the electric jar opener according to Embodiment 1 of the present invention.

The first clamping jaw group 2 comprises two first clamping jaws 21 extending from a bottom of the lower housing 12, and the two first clamping jaws 21 are oppositely-disposed and can move away from each other (when they unfold) or close to each other (when they fold). A movement direction of the two first clamping jaws 21 is generally a transverse direction, particularly a horizontal direction, in a use state. The lower housing 12 can guide the movement of the first clamping jaws 21. Each first clamping jaw 21 comprises a first rack portion 211, bent portions 212 arranged at ends of the first rack portions 211 away from a first driven gear 627 and first clamping portions 213 arranged at ends of the corresponding bent portion 212 away from the corresponding first rack portion 211. Each first clamping jaw 21 has a first groove 214 formed on the first rack portion 211 extending from the end which is close to the first rack portion 211 of another first clamping jaw 21 to the bent portions 212 of the first clamping jaw 21. Each first clamping jaw 21 has first teeth 215 formed on the first rack portion 211 arranged on two opposite sides of the first groove 214 (a plurality of first teeth 215 forms a rack), and the first teeth 215 of the two first rack portions 211 are arranged opposite to each other. That is, as shown in FIG. 8, the first teeth 215 of the left first rack portion 211 are located on a front sidewall of the first groove 214, and the first teeth 215 of the right first rack portion 211 are located on a rear sidewall of the first groove 214. The two first rack portions 211 may be arranged in a staggered manner to avoid a mutual interference during movement in opposite directions. "The stagger manner" may be stagger in an up-down direction or in a front-rear direction in FIG. 5. Each bent portion 212 is arranged at an end of corresponding first rack portion 211 away from the first driven gear 627 and is bent in a roughly U-shaped, and first clamping portions 213 are arranged at ends of the corresponding bent portion 212 away from the corresponding first rack portion 211. The first clamping portions 213 are preferably a flexible member.

Figure 9:
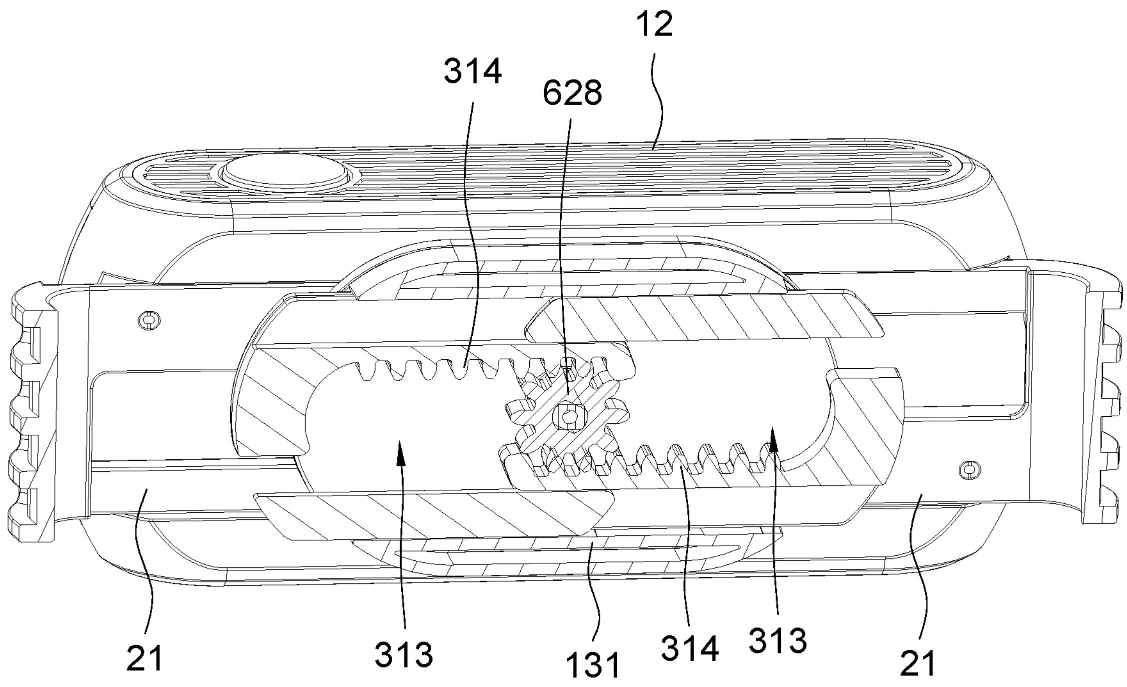
FIG. 9 is a sectional view (transverse section, parallel to the section of FIG. 8) of the electric jar opener according to Embodiment 1 of the present invention.

The second clamping jaw group 3 is arranged below the first clamping jaw group 2 and located between the two bent portions 212. The second clamping jaw group 3 comprises oppositely-disposed mutually facing two second clamping jaws 31, and the two second clamping jaws 31 can move away from each other (when they unfold) or close to each other (when they fold). The movement direction of the two second clamping jaws 31 is generally a transverse direction, particularly a horizontal direction, in the use state. Each second clamping jaws 31 comprises a second rack portion 311 and a second clamping portion 312 arranged at ends of the second rack portion 311 away from the first driven gear 627; wherein, the second clamping jaw group 3 has a hollow second groove 313 formed on a surface of the second clamping jaw group 3, and second teeth 314 are arranged on two opposite sides of the second groove 313 (a plurality of second teeth 314 forms a rack), so that the second teeth 314 are arranged opposite to each other in a manner same as that of the first teeth 215. That is, as shown in FIG. 9, the second teeth 314 of the second rack portion 311 on a left side of the second clamping jaw group 3 are located on a front sidewall of the second groove 313, and the second teeth 314 of the second rack portion 311 on the right side of the second clamping jaw group 3 are located on a rear sidewall of the second groove 313. The two second rack portions 311 may be arranged in a staggered manner to avoid a mutual interference during movement in opposite directions. "The stagger manner" may be stagger in an up-down direction or in a front-rear direction. The second clamping portion 312 is arranged at ends of the second rack portions 311 away from the first driven gear 627 and extend downward. The second clamping portions 312 are preferably a flexible member.

Generally, each first clamping portion 213 is located below each second clamping portion 312, the first clamping portions 213 are used for clamping the jar body, and the second clamping portions 312 are used for clamping a lip in threaded connection to the jar body.

The housing 1 further comprises a rotating housing 13 arranged below the lower housing 12, and the second clamping jaw group 3 protrude from the bottom of the rotating housing 13, so that the rotating housing 13 may guide the movement of the second clamping jaws 31.

The above structure may be the same as the prior art listed in the "Background of the Invention".

To drive the movement of the first clamping jaw group 2 and the second clamping jaw group 3, the jar opener of the present invention further comprises a movement mechanism. Referring to FIGS. 4, 6, 7 and 11, the movement mechanism comprises a motor 61 and a differential 62 with two outputs driven by the motor 61. The operation principle of the differential 62 is the same as that in the prior art. The differential 62 comprises a driving gear 621, two side gears 622, two planetary gears 623, an annular gear 624, a transmission shaft 625, a shell 626, a first driven gear 627 and a second driven gear 628. The driving gear 621 is arranged on an output shaft of the motor 61, and the driving gear 621 engages with the annular gear 624, so that the annular gear 624 can be driven to rotate by the motor 61. In the use state, a rotation axis of the annular gear 624 extends in a longitudinal direction, particularly in a vertical direction, that is, it is perpendicular to the movement direction of the first clamping jaws 21 and the second clamping jaws 31. The shell 626 is a hollow cylinder, which is supported on the annular gear 624 and can rotate together with the annular gear 624. Preferably, the shell 626 and the annular gear 624 realize synchronous rotation in a key-groove fitting manner. That is, a key portion 6241 extending in an axial direction is formed on the annular gear 624, and the shell 626 further has a groove portion 6261 fitted with the key portion 6241. The two planetary gears 623 are rotationally supported in the shell 626, and their rotation axes are perpendicular to the rotation axis of the annular gear 624. Each planetary gears 623 can rotate with the shell 626 about the rotation axis of the annular gear 624, and can also rotate about their own rotation axes relative to the shell 626. Each of the side gears 622 is meshed with one corresponding planetary gear 623, and the two side gears 622 are located on two opposite sides of the planetary gears 623 in the extension direction of the transmission shaft 625, respectively. The transmission shaft 625 passes through the two side gears 622. In the use state, the two side gears 622 consisted of an upper side gear and a lower side gear are arranged at intervals in the up-down direction. An upper end of the transmission shaft 625 is fixed to an upper side gear 622 and thus can synchronously rotate, and the rotation axis of the shell 626 is coaxial with the transmission shaft 625. The transmission shaft 625 passes through a lower side gear 622 and can rotate relative to the side gear 622. The side gears 622 and the planetary gears 623 are all bevel gears.

Each driven gear is defined as an output end of the differential 62, and a first output of the differential 62 is in transmission connection to the first clamping jaws 21 and a second output thereof is in transmission connection to the second clamping jaws 31. Specifically, the first driven gear 627 is used for cooperating with the first clamping jaw group 2 to drive the two first clamping jaws 21 to move, and the second driven gear 628 is used for cooperating with the second clamping jaw group 3 to drive the second clamping jaws 31 to move. In this embodiment, the first driven gear 627 is integrated with the lower side gear 622. Alternatively, the first driven gear 627 and the lower side gear 622 may be fixedly connected. The first driven gear 627 is coaxial with the side gears 622. The transmission shaft 625 passes through the first driven gear 627 and can rotate relative to the first driven gear 627, and the first driven gear 627 passes through the annular gear 624 and is at least partially exposed to a lower portion of the annular gear 624. Referring to FIG. 8, the first driven gear 627 is a straight gear, and thus is meshed with the first teeth 215 of the first clamping jaws 21 and can drive the first clamping jaws 21 to move straightly during its rotation. The second driven gear 628 is located below the first driven gear 627, and the transmission shaft 625 passes through the second driven gear 628 and is then fixed, thereby realizing synchronous rotation of the transmission shaft 625 and the second driven gear 628. Referring to FIG. 9, the second driven gear 628 is a straight gear, and thus is meshed with the second teeth 314 of the second clamping jaws 31 and can drive the second clamping jaws 31 to move straightly during its rotation. The rotation axes of the first driven gear 627 and the second driven gear 628 are coaxial with the transmission shaft 625. The connection between the transmission shaft 625 and the upper side gear 622 and the connection between the transmission shaft 625 and the second driven gear 628 may be realized by a flat shaft passing through a flat shaft hole, so that synchronous rotation of the transmission shaft 625 and the second driven gear 628 can be realized. A part of the transmission shaft 625 passing through the lower side gear 622 and the first driven gear 627 is cylindrical, so that relative rotation can be realized. The lower end of the transmission shaft 625 is located in the second driven gear 628.

When the motor 61 is started, the annular gear 624 is driven to rotate by the driving gear 621, so that the two planetary gears 623 are driven to rotate by the shell 626. The rotation axis is coaxial with the transmission shaft 625 (i.e., the axis of the transmission shaft 625). This is the revolution. Thus, the two side gears 622 are driven to rotate synchronously, and the rotation axis is coaxial with the transmission shaft 625, so that the upper side gear 622 drives the transmission shaft 625 to rotate so as to drive the second driven gear 628 to rotate, and the lower side gear 622 drives the first driven gear 627 to rotate. In the process of moving the first clamping jaw group 2 and the second clamping jaw group 3 to clamp the respective objects, if the resistances are the same, the two planetary gears 623 do not rotate about their own axes; and, if the resistances are different, or when the first clamping jaw group 2 does not move while the second clamping jaw group 3 rotates in the processing of opening the jar, the planetary gears 623 start to rotate about their own axes (the rotation axis is perpendicular to the transmission shaft 625), so that the rotation speeds of first driven gear 627 and the second driven gear 628 are different, thereby ensuring the operation stability during the lid screwing process.

Referring to FIGS. 3-5 and 12 again, the rotating housing 13 comprises a bottom plate 131 and a rotating device 132 arranged on an upper surface of the bottom plate 131, the second clamping jaws 31 protrude from a bottom of the bottom plate 131, and the bottom plate 131 has a partial bottom surface protruded upward for receiving the second driven gear 628. The rotating device 132 comprises a first circular ring 1321 and a second circular ring 1322 which are arranged at intervals in the radial direction from inside to outside, the first circular ring 1321 comprises a first semicircle 1323 and a second semicircle 1324 which are combined to form the whole first circular ring 1321, and a diameter of the first semicircle 1323 is smaller than that of the second semicircle 1324, and there is a smooth transition between the two semicircles. The first circular ring 1321 is higher than the second circular ring 1322. Two cam grooves 1325 recessed radially inward on a circumferential wall of the second circular ring 1322, and the two cam grooves 1325 are circumferentially symmetrical. The structure of the rotating housing 13 is also the same as that in the document mentioned in the "Background of the Invention". The first circular ring 1321 and the second circular ring 1322 form cam structures, respectively.

Figure 10:
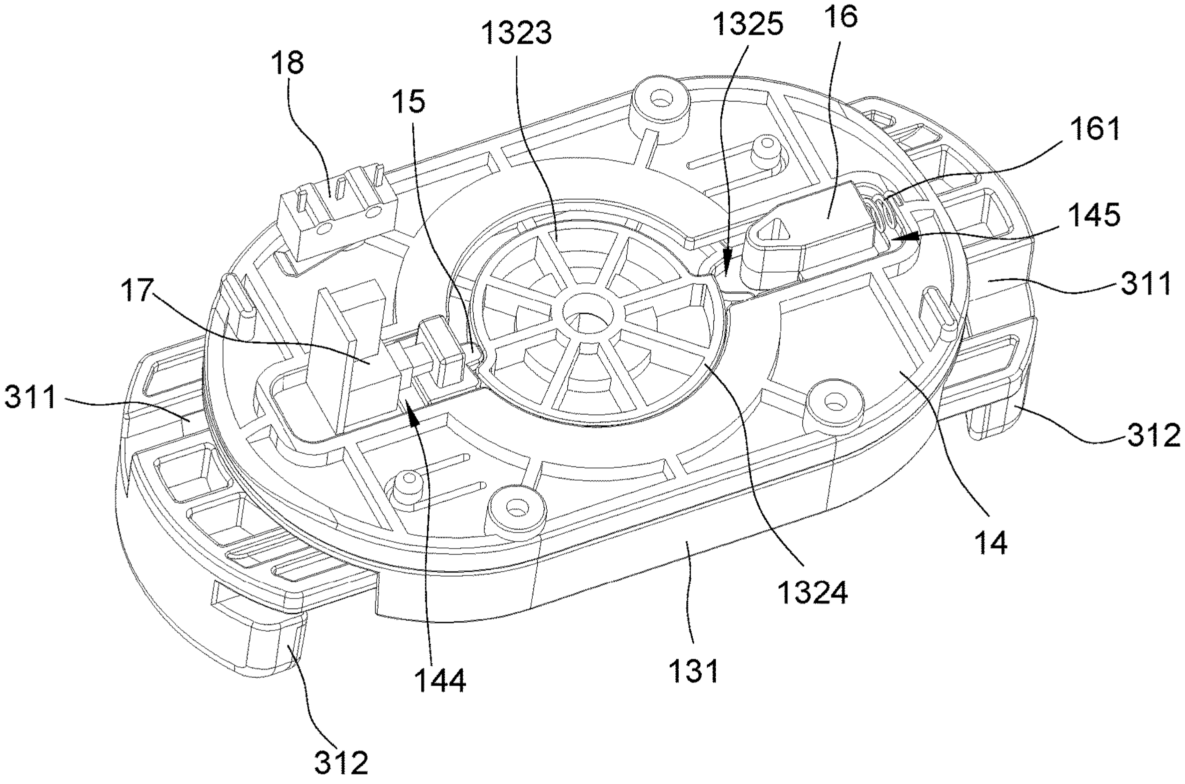
FIG. 10 is a perspective view of a part of the electric jar opener according to Embodiment 1 of the present invention.
Figure 11:
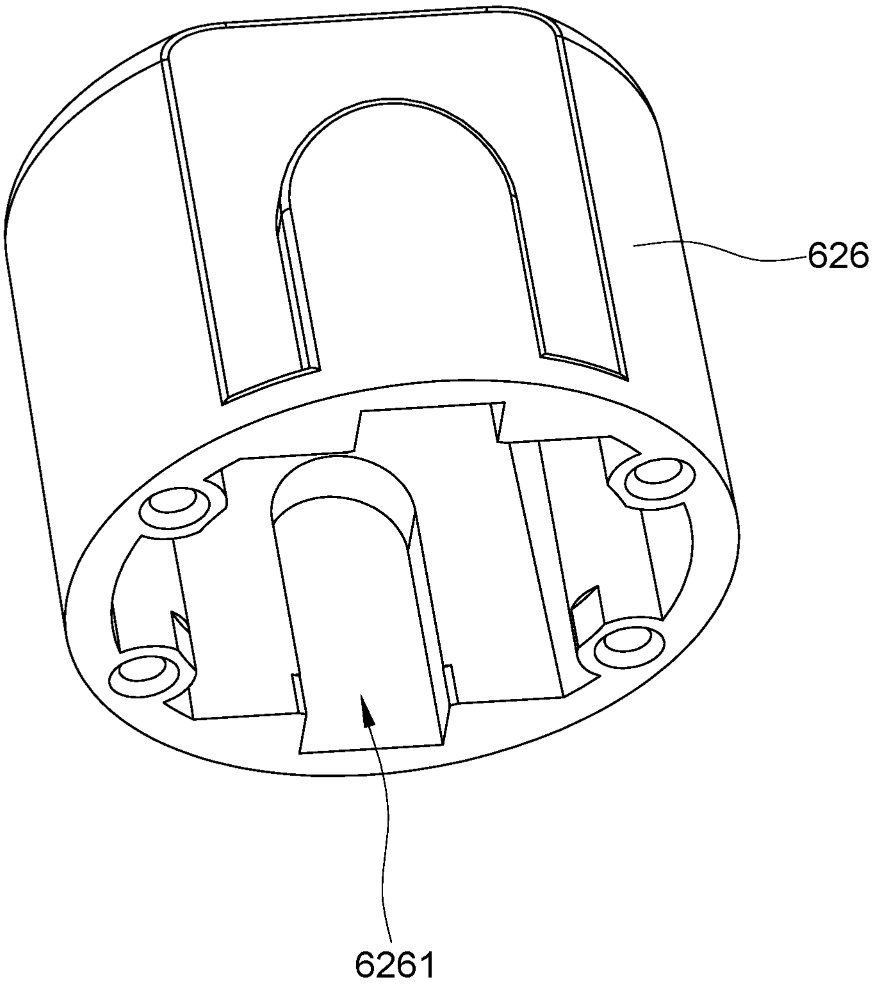
FIG. 11 is a perspective view of a shell of a differential of the electric jar opener according to Embodiment 1 of the present invention.
Figure 12:
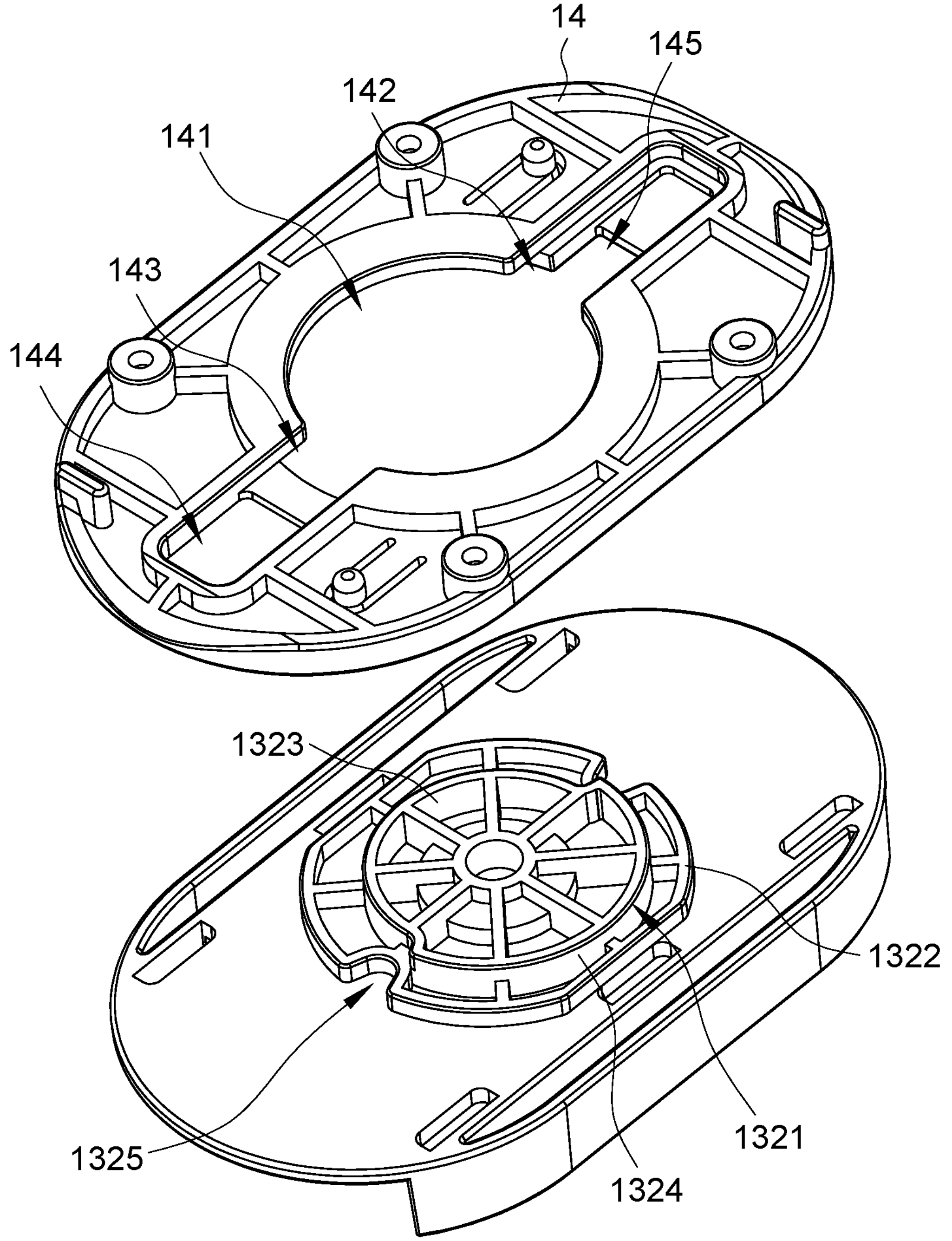
FIG. 12 is an exploded view of a rotating shell and a base of the electric jar opener according to Embodiment 1 of the present invention.
Figure 13:
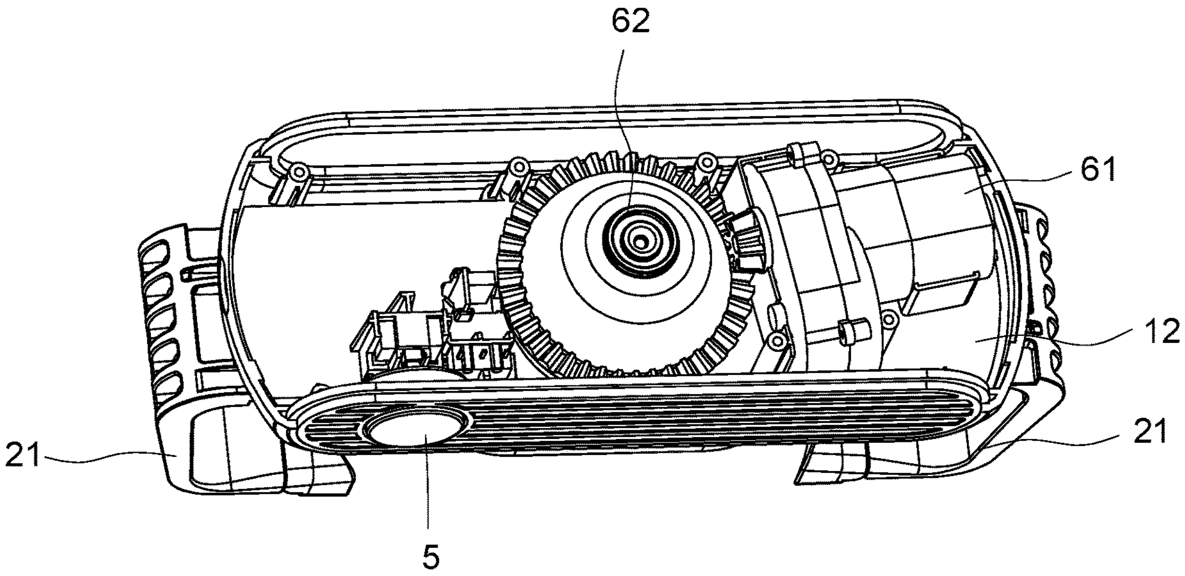
FIG. 13 is a perspective view of an electric jar opener according to Embodiment 2 of the present invention when an upper housing and a battery are omitted.
Figure 14:
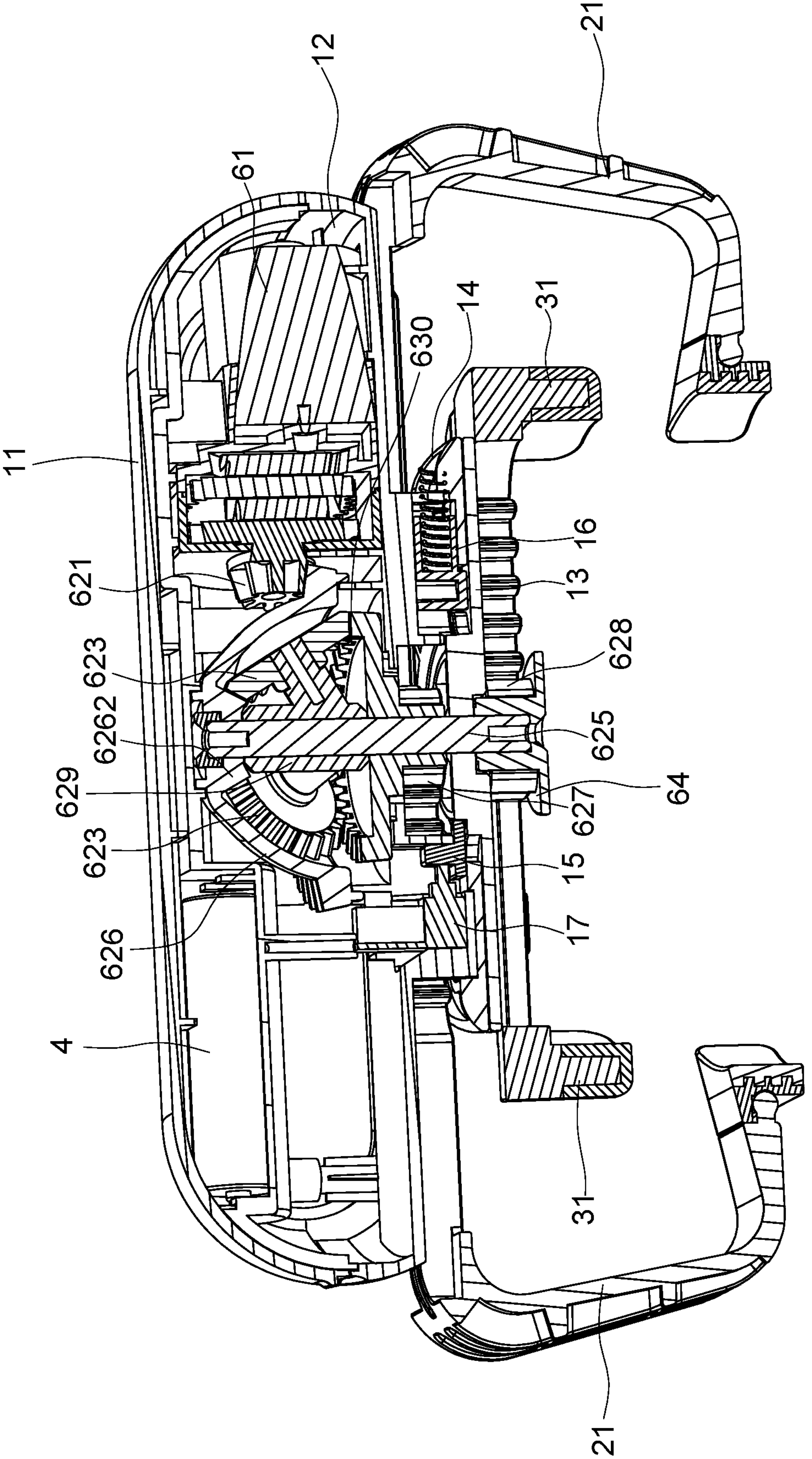
FIG. 14 is a sectional view of the electric jar opener according to Embodiment 2 of the present invention.
Figure 15:
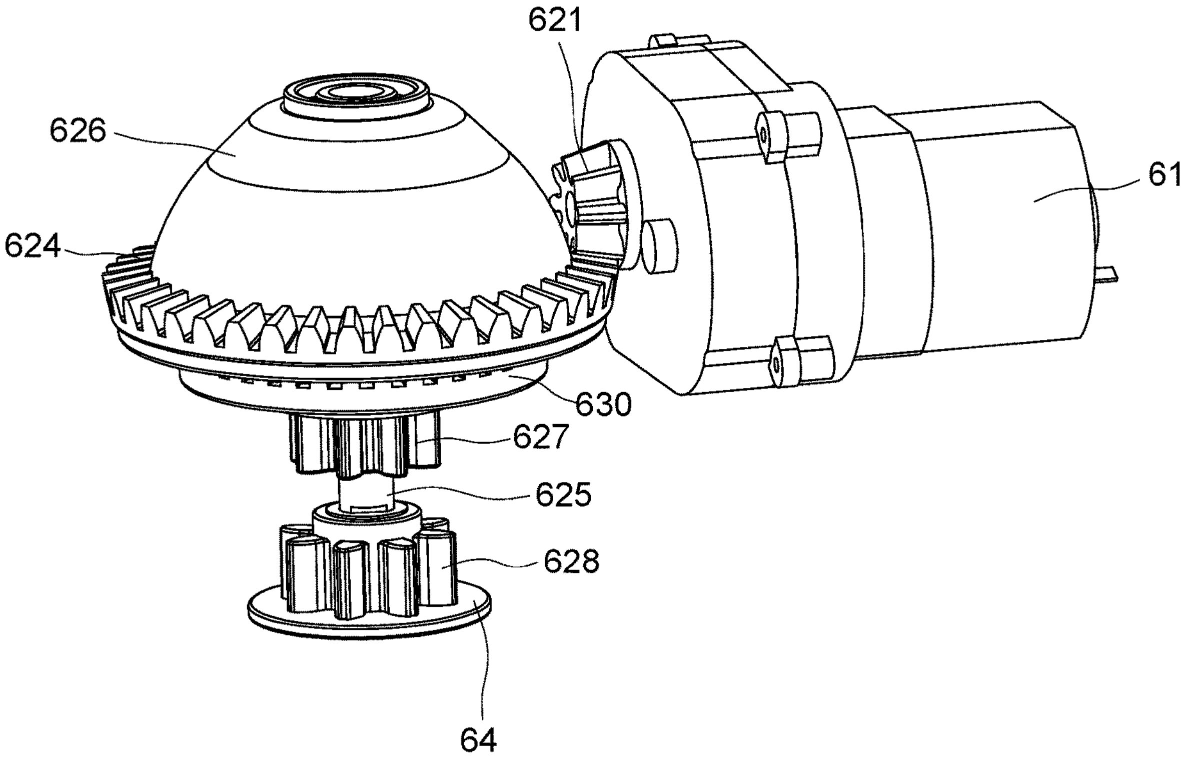
FIG. 15 is a perspective view of a movement mechanism of the electric jar opener according to Embodiment 2 of the present invention.
Figure 16:
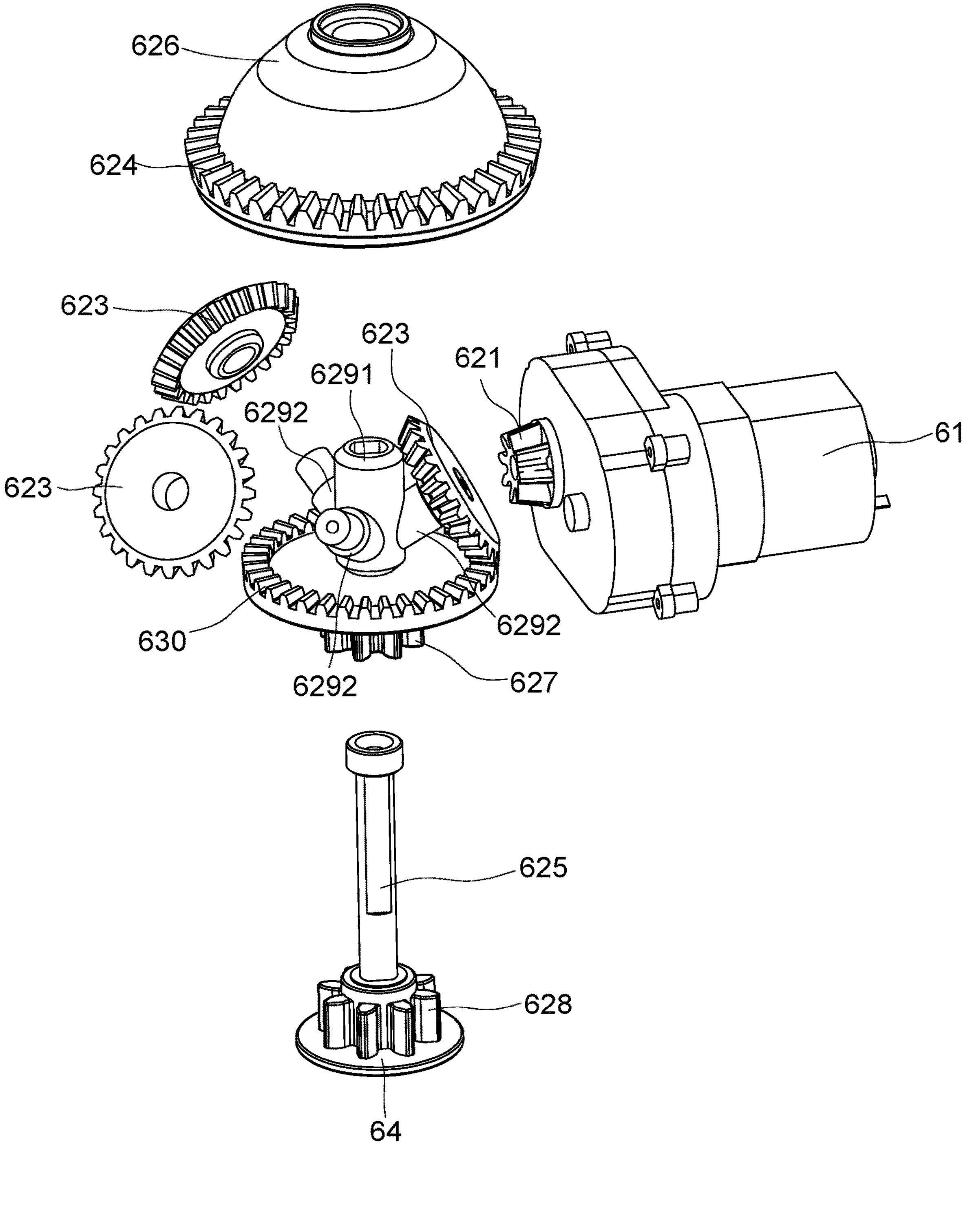
FIG. 16 is an exploded view of the movement mechanism of the electric jar opener according to Embodiment 2 of the present invention.
Figure 17:
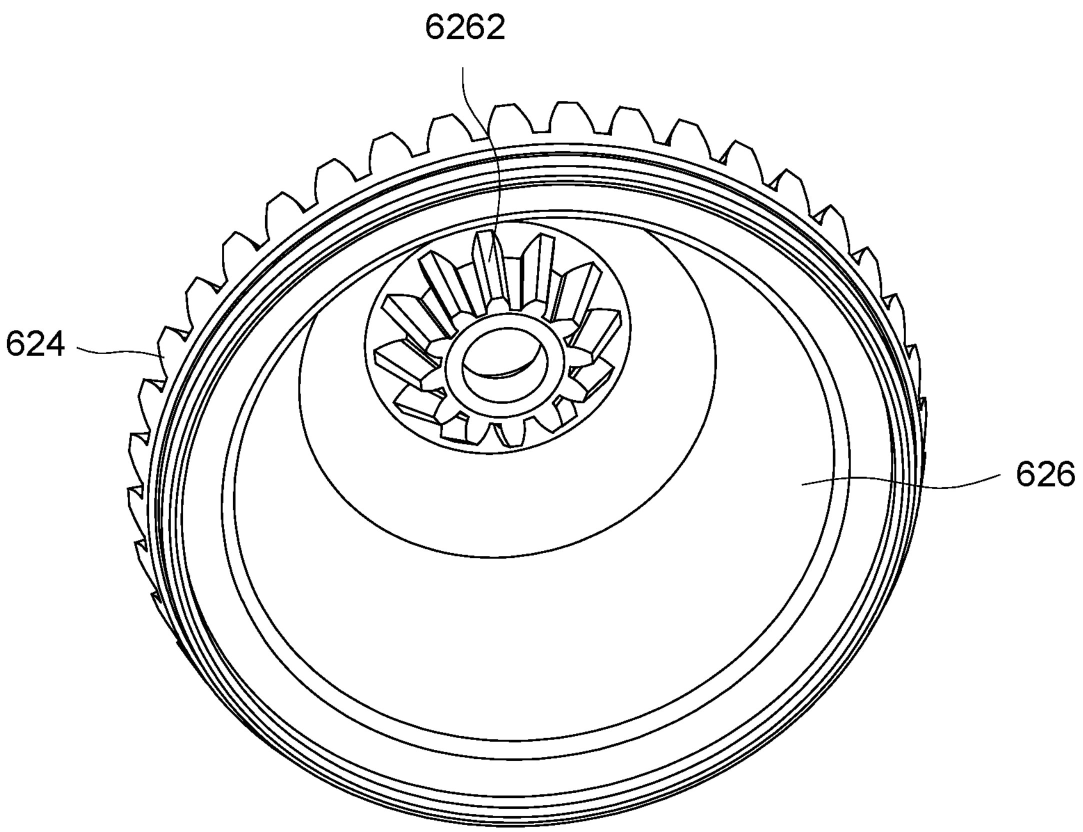
FIG. 17 is a perspective view of a housing of a differential of the movement mechanism of the electric jar opener according to Embodiment 2 of the present invention.

Referring to FIGS. 5, 10 and 12 again, the housing further comprises a base 14 arranged between the lower housing 12 and the rotating housing 13, the base 14 is fixed to the lower housing 12 and has a hole 141 in a middle of the base 14, and the first circular ring 1321 and the second circular ring 1322 of the rotating housing 13 are arranged in the hole 141, so that the rotating housing 13 and the base 14 are rotationally connected. The second driven gear 628 is located below the rotating housing 13, and the second driven gear 627 is located above the rotating housing 13. A baffle 64 is arranged on a bottom of the second driven gear 628, and the baffle 64 can support the bottom of the second clamping jaw 31, so that the second clamping jaw group 3 and the rotating housing 13 are supported in the up-down direction and are prevented from falling off. The baffle 64 may be integrated with or fixedly connected to the second driven gear 628. The upper end of the second driven gear 628 extends into the bottom of the rotating housing 13.

The base has a first notch 142 and a second notch 143 at a circumferential wall of the hole 141, and the first notch 142 and the second notch 143 are circumferentially symmetrical. A driven cam 15 and a cam extension portion 16 are also arranged on the base 14, and the driven cam 15 may be fitted with the circumferential wall of a part of the first circular ring 132 higher than the second circular ring 1322 through the first notch 142 or the second notch 143. The cam extension portion 16 may be fitted with the second circular ring 1322 through the first notch 142 or the second notch 143, and thus may be inserted into the cam grooves 1325.

The base 14 further comprises a first guide rail slot 144 and a second guide rail slot 145, wherein the driven cam 15 is restricted in the first guide rail slot 144 and can slide relative to the first guide rail slot 144, the cam extension portion 16 is restricted in the second guide rail slot 145 and can slide relative to the second guide rail slot 145, and the sliding directions of the driven cam 15 and the cam extension portion 16 are consistent with the movement direction of the second clamping jaws 31. The cam extension portion 16 in urged into the second circular ring 1322 through an elastic member 161.

A steering switch 17 is also arranged on the base 14, the driven cam 15 leaves the steering switch 17 when it is closely adhered to the first semicircle 1323, and the driven cam 15 is resisted against the steering switch 17 when it is closely adhered to the second semicircle 1324.

A stop switch 18 is arranged between the lower housing 12 and the upper housing 11. The stop switch 18 may be a micro switch, and its contact point passes through the lower housing 12 downward and may cooperate with the first clamping jaws 21. The first clamping jaws 21 has a slot so that the contact point of the stop switch 18 may slide in the slot. When the ends of the slot are resisted against the contact point of the stop switch 18, the motor 61 is controlled to stop. The slot may also be replaced with convex point. The way of cooperating the first clamping jaws 21 with the stop switch 18 is also the same as that in the prior art listed in the "Background of the Invention".

When in use, the electric jar opener is placed on the lid of the jar, the button 5 is then pressed down to start the motor 61 so as to drive the first driven gear 627 and the second driven gear 628 to rotate through the differential 62. The first clamping jaws 21 and the second clamping jaws 31 can rotate synchronously; or, it is also possible to move the second clamping jaws 31 first through the fitting (size, friction, the position of teeth, etc.) of the clamping jaws with the corresponding rack portions, and then move the first clamping jaws to clamp the jar body when the second clamping jaws 31 clamp the lid. In the initial state, the cam extension portion 16 is inserted into the cam grooves 1325 to limit the rotation of the rotating housing 13, so that the rotating housing 13 is fixed relative to the base 14 and kept after the first clamping jaws 21 move to clamp the jar body.

After the two clamping jaw groups clamp the respective objects, since the transmission shaft 625 still rotates, an additional force transmitted to the second driven gear 628 through the transmission shaft 625 will generate a rotating force on the rotating device 132. This rotating force is sufficient to enable the rotating device 132 to overcome the resistance of its rotational movement. This resistance comes from the elastic member 161 that forces the cam extension portion 16 to enter the cam groove 1325. Thus, when the motor 61 rotates continuously, the rotating device 132 is allowed to rotate, so that the cam extension portion 16 is not fitted with the cam groove 1325 again. The elastic member 161 is compressed and does not limit the rotating housing 13, so that the rotating housing 13 and the second clamping group 3 rotate together. Since the bottom plate 131 of the rotating housing 13 is recessed upward, the side face of the lid can be clamped, and the lid can be driven to rotate relative to the jar body, so that the lid is opened. In the above process, the driven cam 15 moves along the circumferential wall of the first semicircle 1323 and is separated from the steering switch 17.

After the rotating housing 13 rotates by 180° relative to the base 14, the driven cam 15 is converted from a state where it cooperates with the first semicircle 1323 to a state where it cooperates with the second semicircle 1324, so as to move outward radially to resist against the steering switch 17. Meanwhile, the cam extension portion 16 is inserted into the cam groove 1325 again under the action of the elastic member 161, and starts to limit the rotation of the rotating housing 13. At this time, the motor 61 receives a signal from the steering switch 17 and starts to rotate reversely, so that the first driven gear 627 and the second driven gear 628 rotate reversely. Thus, the two clamping jaw groups start to leave the corresponding jar body and lid (the first clamping jaws 21 and the second clamping jaws 31 move away from each other) until the first clamping jaws 21 are resisted against the stop switch 18 and the motor 61 stops operation, thereby completing the jar opening operation.

Embodiment 2

Referring to FIGS. 13-17, this embodiment differs from Embodiment 1 in that the structure of the differential 62 of the movement mechanism is different. The differential 62 comprises a driving gear 621, two planetary gears 623, a transmission shaft 625, a first driven gear 627 and a second driven gear 628, which all are the same as those in Embodiment 1. The difference is that the annular gear 624 of the differential 62 is arranged on the periphery of the shell 626 and integrated with the shell 626 and the annular gear 624 engages with the driving gear 621. A first transmission gear 6262 is arranged in the shell 626, and the first transmission gear 6262 is also integrated with the shell 626 and is preferably a bevel gear.

The differential 62 further comprises a support frame 629 disposed inside the shell 626, the support frame 629 comprises a main rod 6291 and a plurality of branch rods 6292 connecting to the main rod 6291; wherein the main rod 6291 is a hollow structure which is coaxial with the transmission shaft 625, the transmission shaft 625 passes through the main rod 6291 and is fixed to the shell 626 (the first transmission gear 6262), and the transmission shaft 625 rotates together with the main rod 6291. The branch rods 6292 gradually extend upward obliquely from an outer circumferential wall of the main rod 6291 in a direction away from the main rod 6291, three branch rods 6292 arranged at equal intervals in the circumferential direction of the main rod 6291, and an angle of inclination of each branch rod 6292 is the same. Therefore, the number of the planetary gears 623 is also three, so that the transmission through the planetary gears 623 can be more stable. Each branch rod 6291 corresponds to one planetary gear 623, and each planetary gear 623 is rotatably arranged on one branch rod 6292.

The differential 62 further comprises a second transmission gear 630, the second transmission gear 630 and the first driven gear 627 rotate together. The both are preferably integrated, and may be arranged between the support frame 629 and the first driven gear 627. The second transmission gear 630 is equivalent to the lower side gear 622 in Embodiment 1. Each of the planetary gears 623 engages with the first transmission 6262 and the second transmission gear 630, respectively.

Thus, when the motor 61 is started, the annular gear 624 (the shell 626) is driven to rotate through the driving gear 621, so that the three planetary gears 623 are driven to rotate through the first transmission gear 6262 in the shell 626. The rotation axis is coaxial with the transmission shaft 625. This is the revolution of the transmission shaft 625. The second transmission gear 630 is driven to rotate. The rotation axis is coaxial with the transmission shaft 625. Thus, the shell 626 drives the second driven gear 628 to rotate through the transmission shaft 625, and the second transmission gear 630 drives the first driven gear 627 to rotate. In the process of moving the first clamping jaw group 2 and the second clamping jaw group 3 to clamp the respective objects, if the resistances are the same, the planetary gears 623 do not rotate about their own axes; and, if the resistances are different, or when the first clamping jaw group 2 does not move while the second clamping jaw group 3 rotates in the processing of opening the jar, the planetary gears 623 start to rotate about their own axes, and the rotation axis is inclined to the transmission shaft 625, so that the rotation speeds of the first driven gear 627 and the second driven gear 628 are different, thereby ensuring the operation stability during the lid screwing process.

Compared with two side gears 622 and two planetary gears 623 being needed in Embodiment 1, in this embodiment, only three planetary gears 623 need to be mounted, so that it is easy to mount, the mounting accuracy is required lowly, and large-torque output jar also be realized.

The invention claimed is:

1. An electric jar opener, comprising:

a housing;

a first clamping jaw group extending from the housing;

a second clamping jaw group extending from the housing;

a movement mechanism disposed inside the housing;

wherein, the first clamping jaw group comprises two oppositely-disposed mutually facing first clamping jaws for clamping a jar body, and the second clamping jaw group comprises two oppositely-disposed mutually facing second clamping jaws for clamping and screwing a lid;

the movement mechanism comprises a motor and a differential with two outputs driven by the motor, the movement mechanism is capable of driving the first clamping jaws and the second clamping jaws to move;

a first output of the differential is in transmission connection to the first clamping jaws and a second output thereof is in transmission connection to the second clamping jaws;

the differential comprises one or more planetary gears, a transmission shaft, a rotatable shell, an intermediate gear, a first driven gear and a second driven gear;

an annular gear is connected to the rotatable shell, and a driving gear attached to the motor is connected to the annular gear;

wherein the rotatable shell is driven by the motor to rotate about an axis of the transmission shaft;

each planetary gear is disposed inside the shell, when the shell is driven by the motor each planetary gear is capable of rotating about the axis of the transmission shaft and is also capable of rotating relative to the shell, the transmission shaft rotates together with the shell;

each planetary gear engages with the intermediate gear, the first driven gear rotates together with the intermediate gear, the second driven gear rotates together with the transmission shaft;

the first driven gear defined as the first output end of the differential is in transmission connection to the first clamping jaws, and the second driven gear defined as the second output of the differential is in transmission connection to the second clamping jaws.

2. The electric jar opener of claim 1, wherein the differential further comprises a support frame disposed inside the shell, the support frame comprises a main rod and one or more branch rods connecting to the main rod;

the transmission shaft passes through the main rod and rotates together with the main rod, each branch rod extends and inclines upward from a periphery of the main rod away from the main rod, each planetary gear is rotatably arranged on one branch rod;

a first transmission gear formed at an inner surface of the shell engages with the planetary gear;

the differential further comprises a second transmission gear defined as the intermediate gear and is integrally connected to the first driven gear.

3. The electric jar opener of claim 1, wherein the differential further comprises two side gears which are arranged around the axis of the transmission shaft, the planetary gear is rotatably supported inside the shell, and the planetary gear engages with the two side gears;

one of the two side gears rotates together with the transmission shaft, while the other of the two side gears is defined as the intermediate gear.

4. The electric jar opener of claim 1, wherein each first clamping jaw comprises a first rack portion engaging with the first driven gear, each second clamping jaw comprises a second rack portion engaging with the second driven gear.

5. The electric jar opener of claim 4, wherein each first clamping jaw further comprises bent portions arranged at ends of the first rack portions away from the first driven gear and first clamping portions arranged at ends of the corresponding bent portion away from the corresponding first rack portion;

each second clamping jaw is arranged below each first rack portion and located between the bent portions, each second clamping jaw further comprises a second clamping portion arranged at an end of the corresponding second rack portion, and each first clamping portion is located below each second clamping portion.

6. The electric jar opener of claim 1, wherein the housing comprises an upper housing, a lower housing and a rotating housing arranged below the lower housing and used for clamping the lid, the second clamping jaws protrude from a bottom of the rotating housing, and the movement mechanism jar drive the rotating housing to rotate relative to the lower housing.

7. The electric jar opener of claim 6, wherein the rotating housing comprises a bottom plate and a rotating device arranged on an upper surface of the bottom plate, the second clamping jaws protrude from a bottom of the bottom plate, and the bottom plate has a partial bottom surface protruded upward for receiving the second driven gear.

8. The electric jar opener of claim 7, wherein the rotating device comprises a first circular ring, the first circular ring comprises a first semicircle and a second semicircle which are combined to form the whole first circular ring, and a diameter of the first semicircle is smaller than that of the second semicircle;

the housing further comprises a base arranged between the lower housing and the rotating housing, and the base is firmly connected to the lower housing and rotatably connected to the rotating housing;

a driven cam resisted against a circumferential wall of the first circular ring and a steering switch for controlling the forward or backward rotation of the motor are also arranged on the base, the driven cam is disengaged from the steering switch when the driven cam engages with the first semicircle, and the driven cam resists against the steering switch when the driven cam engages with the second semicircle.

9. The electric jar opener of claim 7, wherein the rotating device further comprises a second circular ring, two cam grooves recessed radially inward on a circumferential wall of the second circular ring, and the two cam grooves are circumferentially symmetrical;

the housing further comprises a base arranged between the lower housing and the rotating housing, and the base is firmly connected to the lower housing and rotatably connected to the rotating housing;

a cam extension portion is also arranged on the base, and the cam extension portion is urged into one of the cam grooves by a corresponding elastic element.

10. The electric jar opener of claim 1, wherein the annular gear has a key portion, the rotatable shell has a groove portion, and the key portion of the annular gear slots into the groove portion of the rotatable shell to affix the annular gear to the rotatable shell.

* * * * *